March 13, 1973 R. H. SCHULTZ 3,720,810

CARD MARKING APPARATUS

Filed March 5, 1971 2 Sheets-Sheet 1

INVENTOR.
RALPH H. SCHULTZ
BY
Andrew L. Ney
ATTORNEY

INVENTOR.
RALPH H. SCHULTZ
BY
Andrew L. Ney
ATTORNEY 3,720,810

CARD MARKING APPARATUS

Ralph H. Schultz, Norristown, Pa., assignor to Peripheral Sciences, Inc., Norristown, Pa.

Filed Mar. 5, 1971, Ser. No. 121,417
Int. Cl. G06b *7/02;* G06k *1/12, 15/18*
U.S. Cl. 235—61.11 R 8 Claims

ABSTRACT OF THE DISCLOSURE

Apparatus for deforming selected data processing cards so that these cards are readily distinguishable from other cards. A marking device, movable into and out from a path along which a series of cards is moved, is selectively actuated to move into the path of the cards to engage selected cards to bend these cards as they move past the marking device.

The present invention relates, in general, to data processing equipment and, in particular, to apparatus for identifying data processing cards.

In the use of data processing cards, there are various reasons for identifying selected cards from a deck of cards. For example, after a computer program is "written" onto a deck of cards, the cards are run through equipment which checks for various types of errors which may exist on these cards. Those cards containing errors should be identified so that the necessary corrections may be made.

At the present time, there exist various types of equipment for identifying selected data processing cards so that identified cards are distinguishable from others. Among the more common approaches are printing marks or symbols on the card and nicking or notching an edge of the card. Printing has the disadvantage that the marking is not readily apparent, as for example, when the card deck is viewed on edge. Nicking or notching the cards has the disadvantage that the cards cannot be marked properly as they move rapidly through the marking apparatus but rather must be slowed down considerably or brought to a complete standstill. Still another shortcoming of notching or nicking is that small particles severed from the card are disturbing and can cause malfunctioning of the marking apparatus.

Accordingly, it is an object of the present invention to provide new and improved apparatus for identifying data processing cards.

It is another object of the present invention to provide apparatus of this type which permits rapid handling of data processing cards.

It is a further object of the present invention to provide apparatus which marks selected data processing cards in such a manner that the marked cards are readily distinguishable from unmarked cards.

It is yet another object of the present invention to provide apparatus which is relatively simple in construction and inexpensive to fabricate.

Apparatus for identifying data processing cards constructed in accordance with the present invention includes means for supplying control signals to identify selected cards from a series of data processing cards and means for moving this series of cards along a predetermined path. Also provided are means for sensing the passage of selected sectors of the cards past a selected point and a marking device movable into and out of the predetermined path. The marking device is actuated by control means responsive to the control signals and the sensing means. When actuated, the marking device moves into the path of the cards to engage a card passing the marking device to deform this card.

For a better understanding of the present invention, together with other and further objects thereof, reference is made to the following description, taken in connection with the accompanying drawing, and its scope will be pointed out in the appended claims.

Referring to the drawings.

Figure 1:
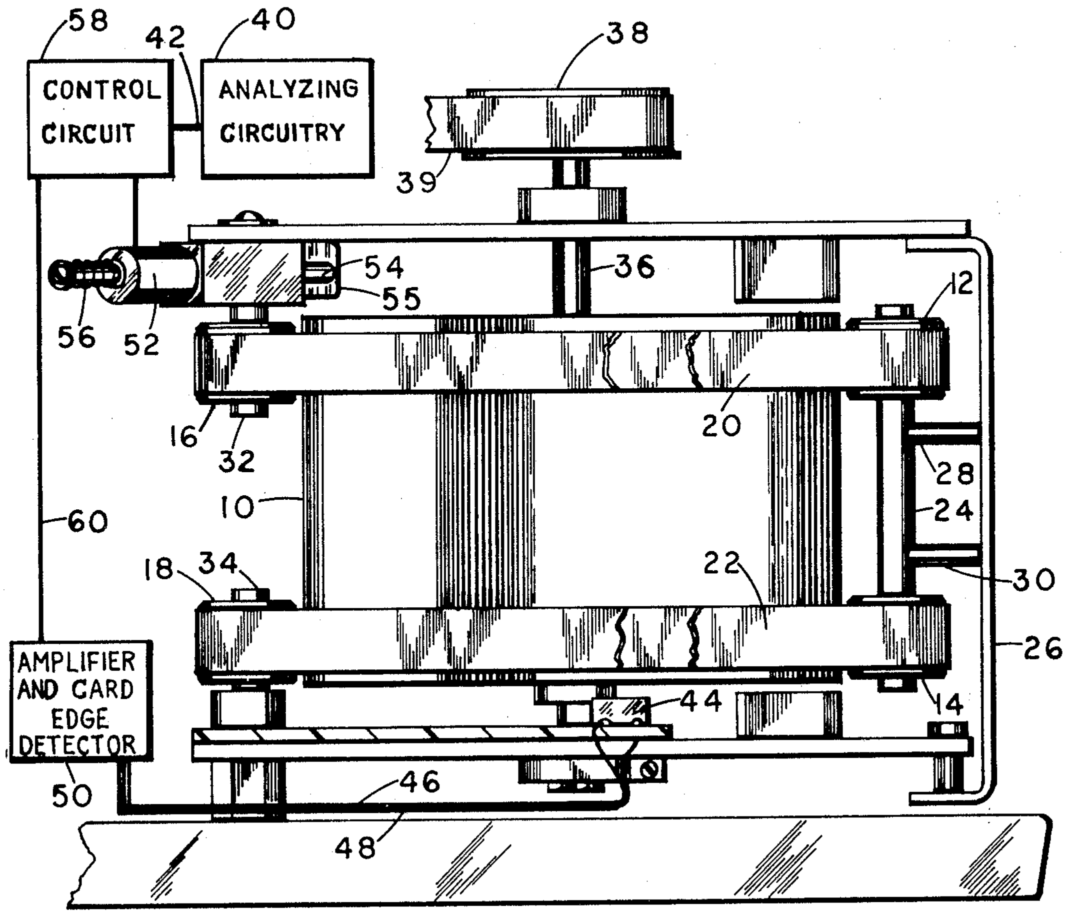
FIG. 1 is an end view of a preferred embodiment of apparatus constructed in accordance with the present invention.
Figure 2:
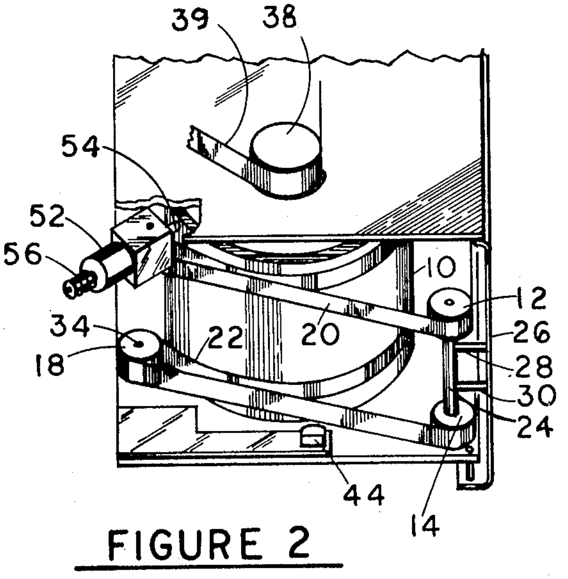
FIG. 2 is a perspective view of a portion of the FIG. 1 apparatus on an enlarged scale.

Referring to FIGS. 1 and 2, wherein like reference numerals correspond to the same components (the present invention includes means for moving a series of data processing cards along a predetermined path. Such means may include a drum 10, a plurality of idler pulleys 12, 14, 16 and 18 and a pair of belts 20 and 22. Pulleys 12 and 14 are rotatably mounted on a common spindle 24, which, in turn, is secured to the housing 26 of the apparatus by a pair of brackets 28 and 30. Pulleys 16 and 18 are rotatably mounted on spindles 32 and 34, respectively, which, in turn, are secured to the housing by suitable means.

Belts 20 and 22 are endless. They are spaced apart approximately the height of a standard data processing card. Belt 20 is in driving engagement with pulleys 12 and 16 and one or more pulleys (not shown) located within the apparatus remote from the near end illustrated in FIGS. 1 and 2. The arrangement of these pulleys and belt 20 is such that the belt is in intimate contact with drum 10. Belt 22 similarly is in driving engagement with pulleys 14 and 18 and one or more pulleys (not shown) located within the apparatus. This arrangement results in belt 22 being in intimate contact with drum 10.

Drum 10 is mounted on a shaft 36 which, in turn, is rotatably mounted on the housing by suitable means, such as bearings, which are not shown. Also mounted on shaft 36 is a drive pulley 38 which is driven by a belt 39. Belt 39 is driven by suitable means, such as a motor, which are not shown.

The invention also includes means for supplying control signals to identify selected cards from the series of cards which are moved through the mechanism described above. Such means may include various types of detection devices and circuitry, identified as analyzing circuitry 40, the details of which are not part of this invention. Analyzing circuitry 40 examines and analyzes the data from cards and develops control signals representative of the purpose for selecting particular cards for identification. One arrangement which may be employed for this function is a general purpose digital computer. The control signals so developed are supplied along a wire 42.

Located in close proximity to belt 22 are means for sensing the passage of selected sectors of the cards. Such means may include a light source and photocell combination 44 which optically senses the passage of the cards and develops signals which are supplied along a pair of wires 46 and 48 to an amplifier and card edge detector 50.

Located in close proximity to belt 20 is a marking device which is movable into and out of the path along which the cards are moved. This device may be an electrically actuated solenoid 52 having an axially movable core member 54, the leading end of which is blunt. A coil spring 56 biases core member 54 in its retracted position as illustrated in FIG. 1. With core member 54 in its retracted position, the leading end of the core member does not extend into the path along which the cards move.

When actuated, solenoid 52 causes core member 54 to move axially toward a plate 55 a sufficient amount for the leading end of the core member to extend into the path along which the cards move. In this position of the core member 54, coil spring 56 is compressed. Upon removal of the actuating signal, coil spring 56 retracts core member 54 from the path of the cards.

Solenoid 52 is actuated by control means identified as control circuit 58. Control circuit 58 is responsive to the control signals developed by analyzing circuitry 40 and the sensing signals developed by photocell 44 and amplifier and card edge detector 50. The control signals and the sensing signals are supplied to control circuit 58 along wires 42 and 60, respectively. Control circuit 58 may be a conventional coincidence circuit which actuates solenoid 52 when both a control signal and a sensing signal are supplied simultaneously.

Figure 3:
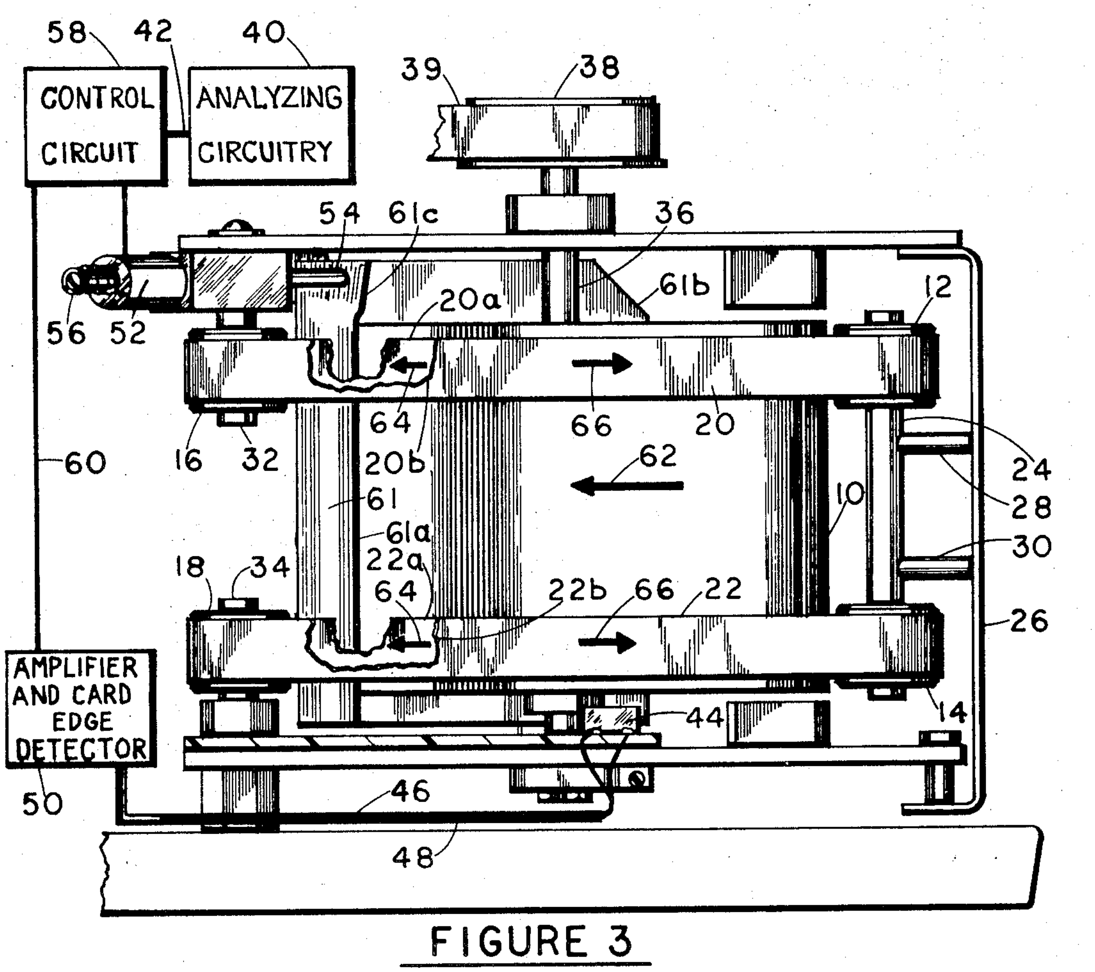
FIG. 3 is an end view, similar to FIG. 1, showing the invention marking a data processing card.

Referring to FIG. 3, a deck of data processing cards, located in an input hopper (not shown) are supplied in series by conventional means to a position between drum 10 and belts 20 and 22. In particular, a card 61 is held tightly between drum 10 and inner convolutions 20*a* and 22*a* of belts 20 and 22. As drum 10 is driven through belt 39, pulley 38 and shaft 36, the drum turns in the direction indicated by the arrow 62. Through the tight fit of card 61 between the drum and belts 20 and 22, the card is moved by fractional engagement with the drum with inner convolutions 20*a* and 22*a* of the belts moving in the direction of arrows 64 and outer convolutions 20*b* and 22*b* of the belts moving in the direction of arrows 66. Belts 20 and 22, mounted on idler pulleys, move freely.

As the trailing edge 61*a* of card 61 passes photocell 44, a sensing signal is developed representative of this fact. At this time the leading edge 61*b* of the card is at the far side of drum 10. The sensing signal is supplied to control circuit 58.

If card 61 is to be identified for any of the reasons previously mentioned, analyzing circuitry 40 supplies a control signal to control circuit 58. As a result of the control signal and the sensing signal being supplied simultaneously to control circuit 58, solenoid 52 is actuated and core member 54 is moved into the path of card 61 to engage the card as the card is moving past the solenoid to deform the trailing edge portion of the card with a bend 61*c* in the manner illustrated in FIG. 3. Since the leading end of core member 54 has a blunt surface, card 61 is not nicked or notched. Plate 55 serves as a backstop for the card.

Figure 4:
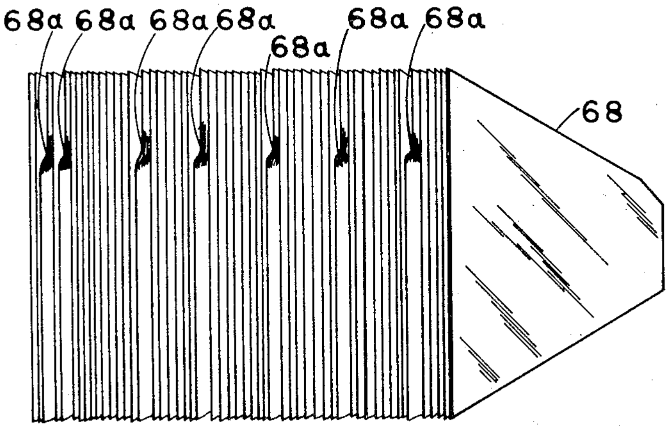
FIG. 4 is an end view, slightly exaggerated, of a deck of data processing cards containing cards marked by the apparatus of FIG. 1.

FIG. 4 is an end view of a deck of data processing cards 68, some of which have been marked by the apparatus described above. Although this figure is slightly exaggerated, it is apparent that bends 68*a* show up quite well, whereby the selected cards may be picked from the deck readily.

While there has been described what is at present considered to be a preferred embodiment of this invention, it will be obvious to those skilled in the art that various changes and modifications may be made therein without departing from the invention and it is, therefore, aimed to cover such changes and modifications as fall within the true spirit and scope of the invention.

What is claimed is:

1. Apparatus for identifying data processing cards comprising:

means for continuously moving a series of data processing cards along a predetermined path;

means for supplying control signals to identify selected cards from said series of data processing cards;

means for sensing the passage of selected sectors of said cards past a selected point;

a movable marking device having a blunt surface which has a path of movement extending through said predetermined path;

and control means responsive to said control signals and said sensing means for actuating said marking device to move said blunt surface through said predetermined path to engage a selected card passing said marking devices and bend said selected card.

2. Apparatus according to claim 1 wherein the marking device is a movable core member of a solenoid.

3. Apparatus according to claim 2 wherein the movable core member is held in a retracted position by a spring so that said core member does not extend into the predetermined path along which the cards move and when the solenoid is actuated by the control means said blunt surface is moved into and through said predetermined path.

4. Apparatus according to claim 1 wherein the marking device bends the trailing edge portion of the selected card.

5. Apparatus according to claim 4 wherein the sensing means sense the passage of the trailing edge of the selected card.

6. Apparatus according to claim 5 wherein the sensing means include a light source and a photocell which develop a signal when the trailing edge of a data processing card passes said light source and said photocell.

7. Apparatus according to claim 1 wherein the blunt surface of the marking device is the leading end of a movable core member of an electrically actuated solenoid.

8. Apparatus according to claim 7 wherein the solenoid is actuated by the control means when a control signal and a signal from the sensing means are supplied simultaneously to said control means.

References Cited

UNITED STATES PATENTS

| | | | |
|---|---|---|---|
| 3,212,203 | 10/1965 | Atkinson | 35—48 |
| 2,113,620 | 4/1938 | Johnson | 235—61.6 E |
| 3,550,290 | 12/1970 | Azure | 235—61.6 E |
| 3,542,287 | 11/1970 | Schen | 235—61.7 R |
| 3,201,569 | 8/1965 | Conron | 235—61.7 R |
| 3,518,440 | 6/1970 | Hanson | 235—61.7 R |
| 3,229,073 | 1/1966 | Macker | 235—61.11 E |

OTHER REFERENCES

Hoernes, G. E., and G. A. Maley: "Self-Teaching Machine," IBM Tech. Disclosure Bull., vol. 1, No. 12, May 1962, p. 27.

MAYNARD R. WILBUR, Primary Examiner

R. M. KILGORE, Assistant Examiner

U.S. Cl. X.R.

35—48 B; 235—61.6 E